United States Patent [19]
Kubota et al.

[11] Patent Number: 4,607,164
[45] Date of Patent: Aug. 19, 1986

[54] RADIATION DETECTING APPARATUS

[75] Inventors: Shigeo Kubota, Kokubunji; Minoru Yoshida, Tokyo; Toshio Takahashi, Hachioji; Hideki Kohno, Tokyo; Takayuki Hayakawa, Hachioji; Sadao Matuoka, Kanagawa; Shigeo Kato, Mitaka; Takaji Suzuki, Kashiwa, all of Japan

[73] Assignees: Hitachi, Ltd.; Hitachi Medical Corporation, both of Tokyo, Japan

[21] Appl. No.: 517,402

[22] Filed: Jul. 26, 1983

[30] Foreign Application Priority Data

Jul. 28, 1982 [JP] Japan ................................. 57-130340
Oct. 22, 1982 [JP] Japan ................................. 57-184483

[51] Int. Cl.$^4$ ............................................... G01T 1/20
[52] U.S. Cl. .................................. 250/363 S; 250/370
[58] Field of Search ................... 250/366, 367, 370 I, 250/370 GX

[56] References Cited

U.S. PATENT DOCUMENTS 4,187,427 2/1980 Cusano ............................... 250/366
4,417,144 11/1983 Hoffman et al. ................. 250/370 I Primary Examiner—Janice A. Howell
Attorney, Agent, or Firm—Antonelli, Terry & Wands

[57] ABSTRACT

A radiation detecting apparatus includes a pair of substrates disposed face to face in such a manner that a plurality of grooves provided in one of the facing surfaces at a predetermined interval face a plurality of grooves provided in the other of the facing surfaces at the predetermined interval. Radiation shielding plates are inserted at both ends thereof into a facing pair of grooves to be held by both of the substrates, scintillators are mounted on a corresponding one of the radiation shielding plates, and photodetectors are fixed to either one of the facing surfaces of the substrates between adjacent grooves so that a plurality of facing pairs of photodetectors are juxtaposed.

12 Claims, 7 Drawing Figures

RADIATION DETECTING APPARATUS

BACKGROUND OF THE INVENTION

The present invention relates to a radiation detecting apparatus using a scintillator which emits light on receiving radiation such as X-rays and γ-rays, and, more particularly, to a radiation detecting apparatus suitable for use in an X-ray computed tomograph (hereinafter referred to as an "X-ray CT").

In an inspecting apparatus using radiation such as the X-ray CT, a radiation detector is required to detect radiation with high sensitivity. Especially, a radiation detector for use in a medical field is required to have a high sensitivity, in order to ensure that the radiation dose used is as small as possible, thereby minimizing the radiation injury to a patient. In other words, the radiation detector is required to have high signal-to-noise ratio. Further, in an X-ray CT, X-rays having passed through a to-be-examined body and thereby subjected to intensity modulation are detected by a plurality of radiation detectors at the same time. In this case, even if the energy intensity of the X-rays is distributed over a wide range, it is required that the radiation detectors are substantially equal in characteristic for X-rays to each other. In short, it is necessary to use radiation detectors having the same characteristics.

As the radiation detector of this kind, a detector has hitherto been known which is formed by combining a scintillator for converting radiation energy into visible light or near ultraviolet radiation and near infrared radiation with a photoelectric conversion element for converting light from the scintillator into an electric signal.

In, for example, U.S. Pat. No. 4,317,037 a radiation detector is proposed which is the combination of a scintillator formed of particles of a scintillator material, and a silicon photodiode. The respective characteristics of the scintillator particles may be slightly different. However, when the scintillator particles are used as one scintillator after having been well mixed, variations in characteristic of the scintillator are reduced. Additionally, in this proposed construction light generated in the scintillator can readily escape to the outside by tilting the scintillator or forming the scintillator of one or more layers.

In, for example U.S. Pat. No. 4,492,869 a radiation detector using a powder scintillator is proposed wherein the detector is superior in signal-to-noise ratio to conventional detectors of this kind.

A radiation detecting apparatus for use in an inspecting apparatus using radiation such as the X-ray CT, is formed by arranging a multiplicity of such radiation detectors with a radiation shielding plate between adjacent radiation detectors. More particularly, a thin plate made of a material having a large absorption coefficient for radiation such as tungsten, tantalum, or molybdenum is interposed between adjacent radiation detectors.

In order to obtain a high-precision, high-resolution, clear sectional image, the width of the radiation detector is preferably in the order of 1 to 3 mm, and it is required to hold a correct positional relationship between the radiation detectors and an X-ray source in a geometrical sense and to make variations in mechanical dimensions of radiation detectors due to the characteristic thereof as small as possible.

In a radiation detecting apparatus having a structure wherein the photodetectors are disposed fixedly on each of a facing pair of substrates at a predetermined interval and a shielding plate provided with a scintillator inserted between a facing pair of photodetectors to form a radiation detector, the geometrical position accuracy of the radiation detector depends upon the accuracy, with which the photodetectors are arranged. Therefore, it is difficult to obtain satisfactory results, and a ring-shaped artifact may be generated in a tomogram. Incidentally, the ring-shaped artifact is generated in the case when the sensitivity of specified ones of radiation detectors for forming the radiation detecting apparatus is different from the sensitivity of the remaining radiation detectors by a predetermined value or more. Further, in order to take out respective outputs of the photodetectors, it is necessary to draw out lead wires from the photodetectors separately and to perform terminal treatment for the drawn-out lead wires. Thus, the amount of work is increased. Further, when an X-ray CT provided with such a radiation detecting apparatus is operated, electric noise is caused by the vibration of the lead wires. Accordingly, not only is the quality of a reconstructed picture image degraded, but also the reliability of the X-ray CT is reduced. Further, the productivity of the radiation detecting apparatus is lowered.

SUMMARY OF THE INVENTION

An object of the present invention is to provide a high-precision, high-accuracy, high-performance, reliable radiation detecting apparatus which has a structure capable of enhancing productivity.

In order to attain the above object, according to the present invention, a radiation detecting apparatus is provided which comprises a pair of substrates disposed face to face with each other and having a plurality of grooves provided therein at a predetermined interval, with radiation shielding plates being inserted in a corresponding one of the grooves, and scintillators each of which are mounted on a corresponding one of the radiation shielding plates, as well as photodetectors provided on at least one of the substrates between adjacent ones of the grooves.

DETAILED DESCRIPTION

Figure 1:
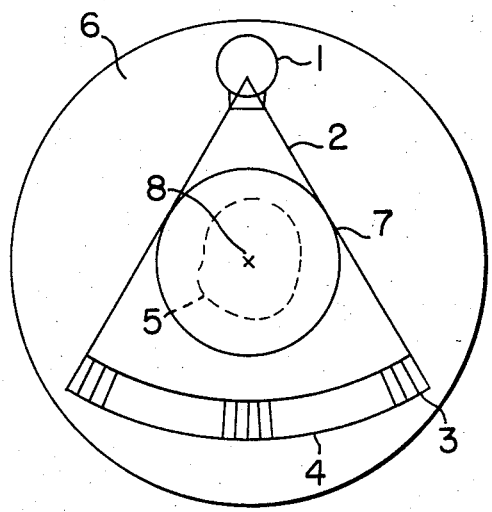
FIG. 1 is a schematic view showing an example of an X-ray CT.

Referring now to the drawings wherein like reference numerals are used throughout the various views to designate like parts and, more particularly, to FIG. 1, according to this figure, an X-ray CT includes a turn table member 6 having a vertically disposed aperature 7 at a central portion thereof, with a body 5 to be examined being placed within the aperture 7. An X-ray radiation source 1 is mounted on a circumferential part of the turn table 6, and an X-ray beam 2, emitted from an X-ray radiation source 1 widening fanwise, passes through the body 5 and is then detected by the radiation detecting apparatus 4 mounted on another circumferential part of the turn table member 6. The radiation detecting apparatus 4 includes an array of thirty to one thousand two-hundred radiation detectors 3 which have the same performance and are arranged on an arc of a circle with a center at the X-ray radiation source 1. The X-ray radiation source 1 and radiation detecting apparatus 4 mounted on the turn table 6 are rotated about the body 5 by rotating the turn table member 6 about the center axis 8 of the aperture 7, and the output of each radiation detector is measured each time the turn table 6 is rotated by a predetermined angle of, for example, 1 degree, to reconstruct a sectional image of the body 5 on the basis of the measured values.

The radiation detecting apparatus 4 of FIG. 1 is formed along a circular arc; however, where the X-ray beam 2 widens in a fanwise fashion with a small included angle, the radiation detectors 3 may be arranged along a straight line. Furthermore, the radiation detecting apparatus 4 need not be mounted on the turn table member 6 but may be fixedly disposed around the turn table member 6, and only the X-ray radiation source 1 need be rotated together with the turn table member 6.

Figure 2:
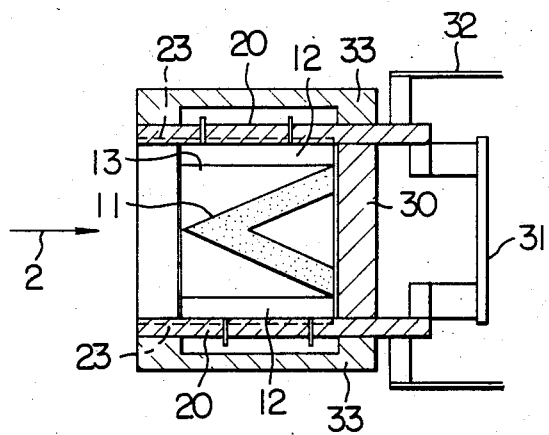
FIG. 2 is a cross sectional view showing an embodiment of a radiation detecting apparatus according to the present invention.
Figure 3:
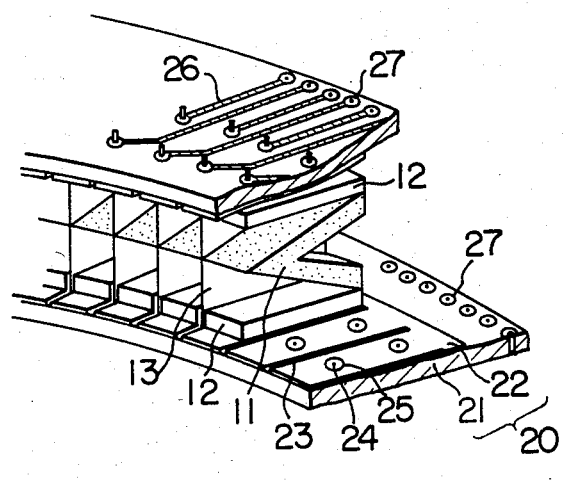
FIG. 3 is a perspective view of the raidation detecting apparatus of FIG. 2.

As shown in FIGS. 2 and 3, in accordance with the present invention, a radiation detecting device includes a pair of substrates 20 for supporting radiation detectors, with each substrate 20 being formed of a fanlike thin plate. A plurality of radially extending grooves 23 are provided in one surface of each substrate 20 at a predetermined interval, corresponding to the width of each radiation detector and is, for example, of the order to 1 to 3 mm. In the embodiment of FIGS. 2 and 3, each substrate 20 includes a plastic substrate 21 made of epoxy resin or the like and an etchable special glass substrate 22 made of FOTOCERAM (registered trademark for a photosensitive glass-ceramic material owned by Corning), FOTOFORM (registered trademark for a amorphous photosensitive glass material owned by Corning) or the like and bonded to one surface of the plastic substrate 21 through an appropriate adhesive (for example, an epoxy resin adhesive) using thermocompression techniques. The grooves 23 are formed in the special glass substrate 22 through a photoetching technique. Each groove 23 is required to have dimensions capable of firmly supporting a radiation shielding plate 13. In the embodiment of FIGS. 2 and 3, the special glass substrate 22 has a thickness of 0.3 mm, and the groove 23 has a depth of 0.3 mm and a width of 0.3 mm, which is equal to the thickness of the shielding plate 13. Further, through holes 24 for mounting photodetectors 12 on the substrates 20 are provided in each of the substrates 20 in radial directions, and the wall of each through hole 24 is coated with a conductive film 25 by plating or the like to ensure a take out an electric signal from each 12. Furthermore, a wiring pattern 26 for taking out the electrical signal from the photodetector 12, and an electric shield (not shown) for preventing the electric induction between photodetectors 12 and the induction from an external electric field are provided on or in a surface of each substrate 20 opposite to the grooves 23. The wiring pattern 26 is so formed so as to connect the through holes 24 and through holes 27 provided in the substrates 20 to relay the electrical signals between the facing substrates 20. Like an ordinary conductive pattern, the wiring pattern 26 is formed by etching a metal layer which is made by plating or the like, for example, a copper plating layer. The photodetectors 12 are mounted on the fanlike substrates, which are disposed face to face with each other and then fixed by a holding plate 30. Leads from the photodetectors 12 are inserted into the through holes 24 and fixed therein by soldering. On the other hand, scintillators 11 for converting radiation 2 into light are attached to the radiation shielding plates 13 by an appropriate adhesive (for example, an epoxy resin adhesive). The radiation shielding plates 13 are inserted into the grooves 23 in the direction of the incident radiation, that is, in the direction of the arrow 2. One radiation detector includes a pair of radiation shielding plates 13 as well as the scintillator 11 and photodetectors 12 disposed between the radiation shielding plates 13.

The electric signals obtained between the facing substrates 20 are relayed by a relay substrate 31, and are applied to a signal processing circuit through taps 32 attached to the substrates 20. A supporting plate 33 is provided for supporting a radiation-detecting-apparatus, with holding plate 30 and supporting plate 33 being preferably coated with or made of a material capable of preventing radiation such as brass, tungsten or lead.

In the present embodiment, the substrate 20 includes the plastic substrate made of epoxy resin and the etchable special glass substrate, by way of example. However, the special glass substrate may be replaced by an etchable metal substrate such as, for example, copper. It is preferable to use such a metal substrate, since it serves as an electric shield. The substrate 20 is not limited to the above-mentioned structure, but may be formed in such a manner that grooves for supporting radiation shielding plates are provided in a ceramics substrate and a wiring pattern is formed on the ceramics substrate through metalizing techniques.

Further, the substrate 20 may also be formed as by a photosetting resin film provided on an ordinary printed board, with grooves for supporting radiation shielding plates are formed in the photosetting resin film through a photoetching technique.

Further, the grooves can be formed by a machining process using a dicing saw. In this case, the grooves may be machined within a permissible error for one substrate, but the dimensions of groove fluctuate in different ranges for different substrates. Accordingly, when a pair of substrates are disposed face to face with each other the difference in dimension accuracy between facing grooves varies widely. On the other hand, according to the present embodiment, a photomask having thereon a plane pattern which includes an array of lines each indicating the same desired shape (or contour) of groove, is fabricated, and the shape of groove is transferred to photo-sensitive glass such as FOTOCERAM and FOTOFORM or a photoresist film applied to a metal plate, by the use of the photomask. Then, grooves are formed by an etching process. Accordingly, when the grooves are formed in each of a large number of substrates, the shape and dimension accuracy of groove at each substrate are identical with those at the plate pattern (namely, the original pattern). When two of these substrates are used to form a multi-element radiation detecting apparatus, each of radiation detectors making up the apparatus is arranged in the apparatus with the same accuracy. This means that the radiation detectors are equally responsible for variations in output characteristic of the apparatus, and that a ring-shaped artifact can be removed. Further, in order to fabricate a radiation detecting apparatus whose output characteristic does not vary, it is necessary to use a pair of substrates which are equal in the dimensions, shape and arrangement accuracy of groove to each other and whose facing surfaces are plane-symmetrical with each other. In the embodiment of FIGS. 2 and 3, a substrate obtained in the above-mentioned manner and another substrate obtained in such a manner that the photomask is turned over in transferring the original pattern, are used to form a radiation detecting apparatus.

According to the embodiment of FIGS. 2 and 3, a correct positional relation in a geometrical sense can be obtained between an X-ray source and the radiation detectors without making use of a grooving operation by machining. Therefore, a change in characteristic of radiation detector due to variations in mechanical dimensions can be less than 3%, and no ring-shaped artifact is generated. Further, grooves are formed in each of a plurality of substrates on the basis of a photomask which includes a large number of patterns equal to each other, and therefore the grooves formed in each substrate are equal in shape and dimension accuracy to each other. Accordingly, a dimension check can be omitted, and a time required for inspection is shortened. Further, since the abrasion of or damage to tools in a machining process is avoided, no defect is generated in a grooving process, and therefore the production yield is increased.

Further, according to the present embodiment, the exchange of scintillator 11 can be performed in such a manner that a radiation shielding plate is drawn out from a groove, and then another radiation shielding plate is inserted into the groove. Accordingly, the maintenance of the radiation detecting apparatus is very easy.

Figure 4:
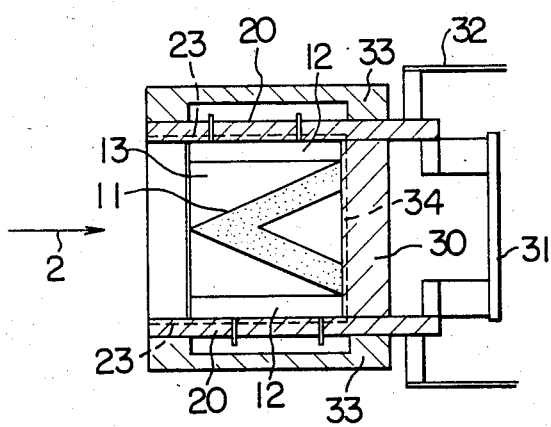
FIG. 4 is a sectional view of another embodiment of a radiation detecting apparatus according to the present invention.
Figure 5:
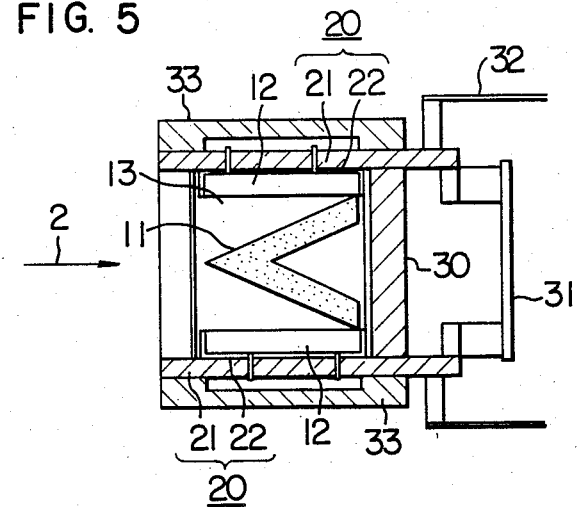
FIG. 5 is a cross sectional view of a further embodiment of a radiation detecting apparatus according to the present invention.
Figure 6:
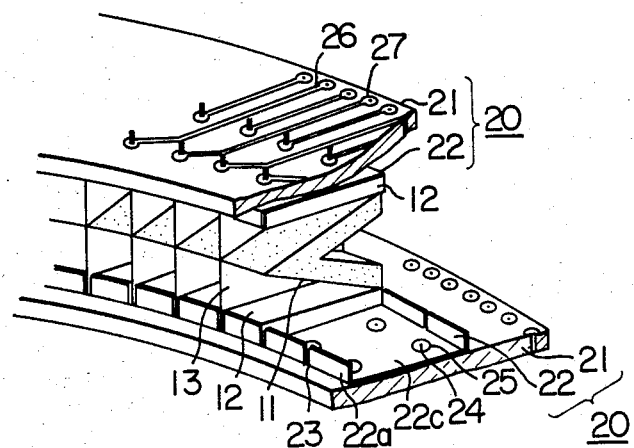
FIG. 6 is a perspective view of the radiation detecting apparatus of FIG. 5.

As shown in FIG. 4 grooves 34 are provided in a holding plate 30, and a radiation shielding palte 13 is inserted not only into respective grooves 23 of substrates 20 but also into the groove 34 of the holding plate 30. That is, the radiation shielding plate 13 is held at top, bottom and rear portions thereof in the radiation detecting apparatus. Referring to FIGS. 5 and 6, each of a pair of supporting substrates 20 for supporting a plurality of radiation detectors at regular intervals in a direction perpendicular to the direction of incident radiation, includes a fanlike insulating flat plate 21 having its top at an X-ray radiation source and made of glass, epoxy resin, ceramics or the like, and a supporting plate 22 bonded to a surface of the insulating flat plate 21 by an appropriate adhesive (for example, an epoxy resin adhesive). The supporting plate 22 has a thickness capable of firmly supporting radiation shielding plates 13 (that is, a thickness of 0.1 to 0.3 mm), and includes a pair of side plates 22a and 22b facing each other and spaced apart to dispose a photodetector 12 therebetween and a bottom plate 22c attached to the insulating flat plate 21. A plurality of grooves 23 for supporting radiation shielding plates 13 are provided in each of the side plates 22a and 22b at a predetermined interval, which corresponds to the width of each radiation detector and is, for example, of the order of 1 to 3 mm. In the present embodiment, the supporting plate 22 is formed of a flat plate which is made of an etchable material (for example, stainless steel, phosphor bronze or the like). That is, the grooves 23 are provided in the flat plate through a photoetching technique, and then the flat plate is bent into a desired shape by the press bending method. Through holes 24 for mounting photodetectors 12 on each supporting substrate 20 are provided in the substrate 20 which has a structure that the insulating flat plate 21 and supporting plate 22 are united in one body, in radial directions starting from the X-ray radiation source. Further, a conductive film 25, a wiring pattern 26, an electric shield (not shown) and through holes 27 are provided on or in each substrate 20, as in the embodiment shown in FIGS. 2 and 3. Like the embodiment shown in FIGS. 2 and 3, the photodetectors 12 are mounted on each substrate 20, and a pair of supporting substrates 20 are fixed by a holding plate 30 so that they face each other. Each radiation shielding plate 13, provided with a scintillator 11, is inserted into the grooves which are provided in the side plates 22a and 22b of the supporting plate 22, in the direction of incident radiation 2 (that is, in the direction with an arrow).

A scintillator 11, used in the present invention, can be formed of a phosphor powder, a single-crystalline phosphor or a polycrystalline phosphor. However, in order to make radiation detectors equal in characteristic to each other, it is preferable to form the scintillator of a phosphor powder. Any phosphor material capable of emitting light on the basis of the absortion of radiation can be used to made the scintillator. In general, $Y_2O_2S$, $La_2O_2S$, $Gd_2O_2S$, $Lu_2O_2S$, $LaOBr$, $BaFCl$, $BaFBr$ and $BaSO_4$, each of which is activated by at least one of Eu, Pr and Tb, are used. Further, (CdS: Cu, Al), (CdS: Ag, Cl), (ZnS: Cu,Al), $CaWO_4$ and $CdWO_4$ may be used. Specifically, such materials as $Gd_2O_2S(Eu)$, $Gd_2O_2S$ (Pr) and $CdWO_4$ are preferable because of high X-ray absorption power and high radiation-light conversion efficiency. Further, a phosphor material $Gd_2O_2S$: Pr, F, Ce is especially preferable since it has a high radiation-light conversion efficiency and a short decay time. In the embodiments described hereinabove, two phosphor layers, made of the material $Gd_2O_2S$: Pr, F, Ce, are connected at their ends to obtain a scintillator having a V-shape cross section, and the scintillator is disposed so that the radiation receiving surfaces of the scintillator are inclined with respect to the direction of incident radiation. Thus, light generated within the scintillator 11 can readily escape to the outside, and a large output is obtained.

Figure 7:
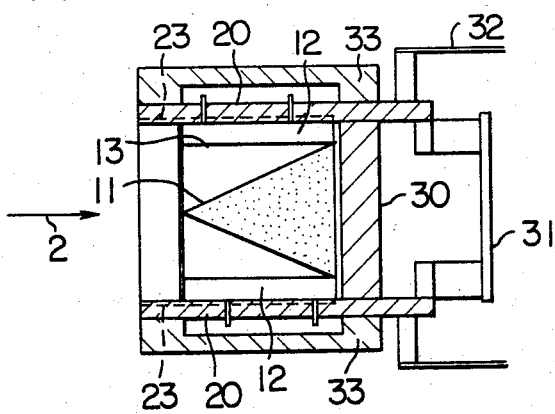
FIG. 7 is a sectional view showing still another embodiment of a radiation detecting apparatus according to the present invention.

Further, a scintillator 11 which has a triangular cross section as shown in FIG. 7, may be used, and can produce the same effect as the scintillator 11 having a V-shaped cross section. Although the scintillator 11 having a triangular cross section, requires a larger amount of phosphor, as compared with the scintillator having a V-shaped section, the former is superior in strength to the latter and is easy to use.

A semiconductor light-sensor such as a silicon photodiode is preferably used as the photodetector 12, and the photodetector 12 is preferably disposed so that the light receiving surface thereof faces the radiation receiving surface of a scintillator 11. This is because the absorption of radiation is greatest in the radiation receiving surface of the scintillator 11 and is especially preferable to take out light generated in the scintillator 11 from the radiation receiving surface of the scintillator 11. Further, it is preferable to deviate the light receiving surface of the photodetector 12 from the direct path of radiation. In more detail, when the light receiving surface of the photodetector 12 is otherwise placed on the direct path of incident radiation, the photodetector 12 may respond to the incident radiation having passed through the scintillator 11, thereby deteriorating the performance and efficiency of the photodetector 12. The photodetectors 12 are provided on each of two substrates 20 which are disposed face to face with each other. However, the photodetectors 12 may be provided on only one of the substrates 20. Further, in order that X-rays scattered by phosphor particles in the scintillator 11 and fluorescent X-rays generated secondarily due to the photoelectric effect are prevented from being incident on the photodetectors, it is preferable to coat the light receiving surface of each photodetector with a material having a low radiation permeability such as lead glass or bismuth germanate ($Bi_4Ge_3O_{12}$).

By virtue of the features of the present invention, wherein a radiation detecting apparatus has an array of radiation detectors each of which provided with a scintillator for converting radiation such as X-rays and γ-rays into light and, more particularly, in a radiation detecting apparatus for use in an X-ray CT, the geometrical position accuracy with which each radiation detector is located for an X-ray source, the mechanical dimension accuracy with which each radiation detector is formed, and variations in characteristic of radiation detector due to the positional accuracy and dimensional accuracy can be made less than 3%. Specifically, since grooves are formed by a photoetching technique, the grooves formed in each of a pair of substrates are equal in shape and dimensional accuracy to each other. Moreover, the facing surfaces of the substrates are plane-symmetrical with each other. Accordingly, the radiation detectors are arranged between the substrates with the same accuracy, and therefore are equal in characteristic to each other. Thus, a ring-shaped artifact is never generated, and the picture quality of a tomogram obtained by an X-ray CT is improved. Further, according to the present invention, parts for forming the radiation detecting apparatus can be simplified and mass-produced. Accordingly, the cost of parts is about one-twentieth of that a conventional fabricating method, an operation for assembling the radiation detecting apparatus and a wiring operation are improved and shortened, and the productivity of the apparatus is enhanced in a great degree. Furthermore, according to the present invention, a radiation detecting apparatus can be realized which is high in precision and resolving power, and excellent in stability and reliability. Moreover, the exchange of scintillator can be made in such a manner that a radiation shielding plate is drawn out from a groove and another radiation shielding plate is inserted into the groove, and therefore the maintenance of the apparatus is very easy.

We claim:

1. A radiation detecting apparatus comprising:
   a pair of substrates disposed face to face, a plurality of photoetched grooves provided in each of said substrates at a predetermined interval;
   radiation shielding plates each inserted into a corresponding one of said grooves;
   scintillators each mounted on a corresponding one of said radiation shielding plates;
   photodetectors each provided on at least one of said substrates between adjacent ones of said grooves; and a wiring pattern provided on at least one of said substrates for taking out electric signals from said photodetectors.

2. A radiation detecting apparatus according to claim 1, wherein each of said substrates includes a first insulating substrate and a second etchable substrate, and said grooves in said second substrate comprises photo-etched grooves.

3. A radiation detecting apparatus according to claim 2, wherein said second substrate comprises a photosensitive amorphous glass material or a photosensitive ceramic material.

4. A radiation detecting apparatus according to claim 2, wherein said second substrate is copper.

5. A radiation detecting apparatus according to claim 2, wherein said second substrate comprises a photohardening resin.

6. A radiation detecting apparatus according to claim 1, wherein each of said substrates includes an insulating flat plate and a supporting member fixed to said insulating flat plate and having a plurality of grooves provided therein.

7. A radiation detecting apparatus according to claim 6, wherein the wiring pattern for taking out electric signals from said photodetectors is provided on said insulating flat plate.

8. A radiation detecting apparatus according to claim 6, wherein said supporting member is made of a material which can be etched by a photoetching technique.

9. A radiation detecting apparatus according to claim 7, wherein said supporting member is made of a material which can be etched by a photoetching technique.

10. A radiation detecting apparatus comprising:
    a pair of substrates disposed face to face, a supporting member fixed to each of said substrates, a plurality of grooves being provided in said supporting member at a predetermined interval, said supporting member being made of a material which can be etched by a photoetching technique;
    radiation shielding plates each inserted into a corresponding one of said grooves;
    scintillators each mounted on a corresponding one of said radiation shielding plates;
    photodetectors each provided on said supporting member between adjacent ones of said grooves; and
    a wiring pattern provided on at least one of said substrates for taking out electric signals from said photodetector.

11. A radiation detecting apparatus according to claim 12, wherein the wiring pattern for taking out electrical signals from said photodetectors is provided on at least one of said substrates.

12. A radiation detecting apparatus comprising:
    a pair of substrates disposed face to face, each of said substrates having a plurality of photoetched grooves formed at a predetermined interval;
    radiation shielding plates fitted into associated grooves in said substrate;
    scintillators provided on each of said radiation shielding plates;
    two photodetectors one provided for each of said scintillators, said two photodetectors being mounted on portions of the respective substrates between adjacent grooves;
    wiring lead means provided on each of said pair of substrates for deriving electric signals from each of said photodetectors; and
    electric connection board means carrying a wiring pattern for electrical connection of said wiring lead means for said two photodetectors provided for each scintillator.

* * * * *